(No Model.)
N. W. GODFREY.
WATER PROOF JOURNAL BEARING.
No. 296,554. Patented Apr. 8, 1884.
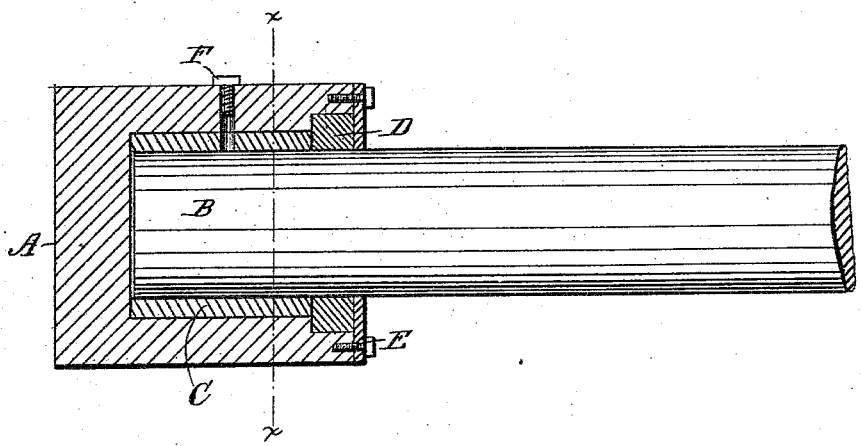
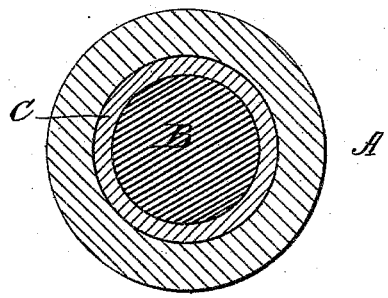
WITNESSES:
W. W. Hollingsworth
A. G. Leyne
INVENTOR:
N. W. Godfrey
BY Munn & Co
ATTORNEYS.

UNITED STATES PATENT OFFICE.

NICHOLAS W. GODFREY, OF NORTHPORT, NEW YORK.

WATER-PROOF JOURNAL-BEARING.

SPECIFICATION forming part of Letters Patent No. 296,554, dated April 8, 1884.

Application filed January 18, 1884. (No model.)

*To all whom it may concern:*

Be it known that I, N. W. GODFREY, of Northport, in the county of Suffolk and State of New York, have invented a new and useful Improvement in Water-Proof Journal-Bearings, of which the following is a full, clear, and exact description, reference being had to the annexed drawings, forming part of this specification.

The object of my invention is to protect the journals of shafting in excavators and other machinery which requires to be immersed in water from contact with water or sand; and the invention consists of the novel construction hereinafter described and claimed.

In the drawings, Figure 1 is a longitudinal section of my improved journal-bearing, and Fig. 2 is a cross-section of the same on line $x$ $x$ of Fig. 1, both views showing a portion of the shafting.

A indicates a socket-bearing, which is to be supported in any suitable frame-work, and B is the journal of a shaft. The socket-bearing is provided with a Babbitt or other anti-friction lining, C, closed in by a packing-ring of flexible material, D, which is secured and compressed by a washer-plate of metal, E, that is to be bolted to the end of the socket-bearing. Through the bearing and its lining is formed an oil-hole, which is stopped by a plug, F.

What I claim is—

The combination, with a journal, of the socket-bearing A, having plug F, the lining C, the flexible packing-ring D, closing in said lining, and the washer E, secured to the end of the socket-bearing, substantially as shown and described, and for the purpose set forth.

NICHOLAS W. GODFREY.

Witnesses:
 EDGAR TATE,
 ALFRED H. DAVIS.